O. WITTMANN.
BATTERY JAR.
APPLICATION FILED APR. 13, 1920.
1,381,608.
Patented June 14, 1921.
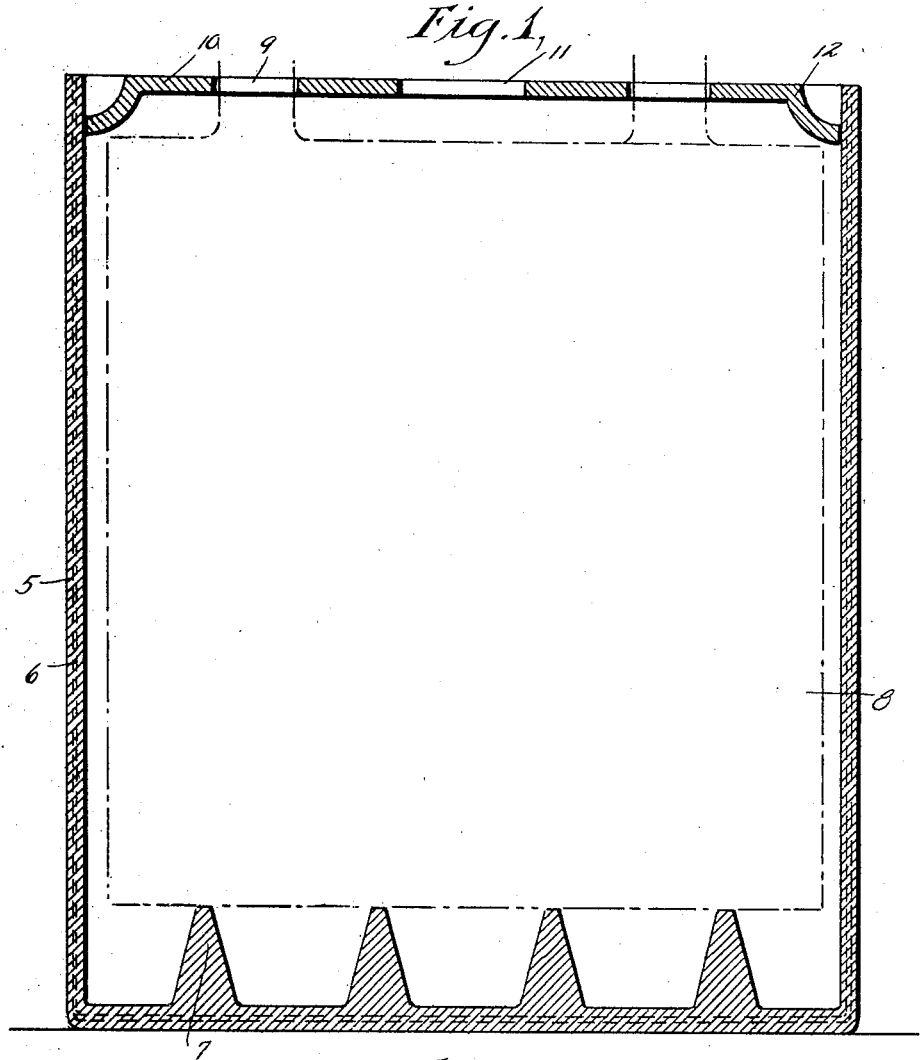
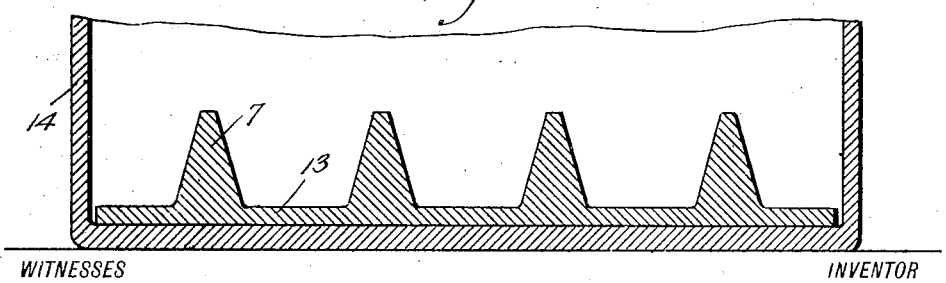
WITNESSES
INVENTOR
OSCAR WITTMANN,
BY
ATTORNEYS

UNITED STATES PATENT OFFICE.

OSCAR WITTMANN, OF LINCOLN, NEBRASKA.

BATTERY-JAR.

1,381,608. Specification of Letters Patent. Patented June 14, 1921.

Application filed April 13, 1920. Serial No. 373,656.

*To all whom it may concern:*

Be it known that I, OSCAR WITTMANN, a citizen of the United States, and resident of the city of Lincoln, in the county of Lancaster and State of Nebraska, have invented a new and Improved Battery-Jar, of which the following is a full, clear, and exact description.

In connection with battery jars, it is well appreciated particularly where the battery is utilized in connection with automotive vehicles, that the plates, and often the cells themselves become cracked, due to the excessive vibration to which they are subjected.

In a case where the plates become cracked, a short circuit will most often result, causing a quick breaking down of the cell in which the breakage has occurred, but where the cell itself becomes cracked, the electrolyte escapes therefrom, resulting in the instantaneous breaking down of the cell, and consequential breaking of the circuit, rendering the entire electric system of the vehicle inoperative.

This defect is to be attributed to the fact that the grid of the plates, the filler therefor, and the walls of the cells are of extremely brittle material, the walls and base of the cell being usually of glass or hard rubber.

With this in view I have constructed a battery jar which is particularly adapted for use in connection with automotive vehicles or other adaptations in which it is subjected to extreme vibration, although the same might readily be employed for any desired use.

Reference is had to the attached sheet of drawings as illustrating one practical embodiment of my invention, and in which drawings, Figure 1 is a sectional side view taken through a battery jar or cell of a battery, showing one form of my device, and Fig. 2 illustrates a second form thereof.

In these views the reference numeral 5 indicates the side walls of a battery jar or cell, which in the form illustrated in Fig. 1 should be composed of a rubber compound possessing elasticity, which side walls may be provided with an embedded layer of cloth fabric 6 to stiffen the same.

The bottom of the cell of a jar is formed in the usual manner with sediment furrows including ridged portions, which portions in the form illustrated in Fig. 1 are composed of the same material as the side walls.

Resting upon the upper faces of the ridges 7 are the plates 8 of the battery the terminal posts of which extend through openings 9 formed in the cover 10, which latter is provided with the usual filling and inspection opening 11.

It is to be noted that the cover is also constructed of a material embodying resilient qualities, and the same is conveniently formed with a grooved down-turned edge 12, which is adapted to receive the conventional filling compound which keys the cover in position, and provides an air-tight seal for the cell.

It may be desired to construct a cell, the side walls and face of which are formed of the usual hard rubber or glass material, and with this in view I have illustrated in Fig. 2 a separate plate 13 adapted to be positioned upon the upper face of the floor of the jar or cell 14, which plate is formed with ridges 7 and is constructed of a rubber or other compound employing resiliency.

It will be appreciated by the constructions illustrated, referring more particularly to Fig. 1, that a cell made in the manner described will embody sufficient cushioning or resiliency to eliminate danger of a cracking of the side walls of the same, due to excessive vibration.

Further, if it is desired to employ a conventional cell construction of glass or hard rubber, this may readily be done by utilizing a plate, as indicated by the reference numeral 13, and associating with the upper end of the cell, a cover such as 10.

In both of the constructions illustrated in Figs. 1 and 2, it will be understood that the plates 8 will be capable of a small amount of shifting when in the cell upon being subjected to excessive vibration by virtue of the resilient qualities employed in the cover 10 and ridges 7, between which they are interposed.

This cushioning effect will serve to eliminate the danger of cracking and deterioration to a minimum, and it will be understood that a battery cell constructed in accordance with my invention will embody far longer life and more satisfactory service than cells now upon the market.

Obviously any size or shape of a cell or battery might be employed and numerous modifications of structure might be resorted to without in the least departing from the scope of my claims, which read:

I claim—

1. A battery jar, including side walls and a floor portion, ridges extending upwardly from said floor portion and within said jar, and a cover applied to said jar, said cover, side walls, and ridge portions being constructed of a resilient material.

2. A battery jar, including side walls and a floor portion, ridges extending upwardly from said floor portion and within said jar, and a cover applied to said jar, said cover, side walls and ridge portions being constructed of a resilient material, and reinforcing means within said side walls and floor of the jar.

3. A battery jar, including side walls and a floor portion, ridges extending upwardly from said floor portion and within said jar, and a cover applied to said jar, said cover, side walls and ridge portions being constructed of a resilient material, and reinforcing material embedded within said side walls and floor of the jar.

4. A battery jar, including side walls and a floor portion, a cover closing the upper end of said jar, said cover being constructed of a material having resilient qualities.

5. A battery jar, including side walls and a floor portion, a cover closing the upper end of said jar, said cover being formed with down-turned edges.

6. A battery jar, and a floor portion, a plate positioned upon said floor portion and being formed with upwardly extending edges, such plate being constructed of a material having resilient qualities.

7. A battery jar, including side walls and a floor portion, a cover closing the upper end of said jar, a plate formed with upwardly extending ridges upon the floor of said jar, said ridges and cover being constructed of a material embodying resilient qualities.

8. A battery jar, including side walls, and a floor portion, and resilient ridges extending upwardly from the floor of said jar.

OSCAR WITTMANN.